(12) United States Patent
Hu

(10) Patent No.: US 8,296,492 B2
(45) Date of Patent: Oct. 23, 2012

(54) POWER SUPPLY CIRCUIT FOR IEEE 1394 INTERFACE

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 169 days.

(21) Appl. No.: 12/910,663

(22) Filed: Oct. 22, 2010

(65) Prior Publication Data

US 2012/0011292 A1    Jan. 12, 2012

(30) Foreign Application Priority Data

Jul. 9, 2010 (CN) .......................... 2010 1 0222486

(51) Int. Cl.
*H05K 7/10* (2006.01)

(52) U.S. Cl. .......................... 710/302; 710/305; 713/300

(58) Field of Classification Search .......... 710/301–306, 710/105; 713/300–340
See application file for complete search history.

(56) References Cited

U.S. PATENT DOCUMENTS

| 7,844,763 | B2 * | 11/2010 | Yu et al. .......................... 710/62 |
| 2007/0252659 | A1 * | 11/2007 | Suenaga et al. .................. 333/32 |

* cited by examiner

*Primary Examiner* — Brian Misiura
*Assistant Examiner* — Kim Huynh
(74) *Attorney, Agent, or Firm* — Altis Law Group, Inc.

(57) ABSTRACT

A power supply circuit for IEEE 1394 interface includes an IEEE 1394 interface control chip, an interface circuit, and a power circuit. The IEEE 1394 interface control chip outputs transmission protocol signals. The interface circuit is electrically connected to the IEEE 1394 interface control chip by a number of differential signal transmission lines. The interface circuit receives the transmission protocol signals and exchanges data with a peripheral device according to the received transmission protocol signals. The power circuit has a voltage decreasing circuit and provides working voltage to the interface circuit. The voltage decreasing circuit receives a DC voltage and converts the received DC voltage to the working voltage.

18 Claims, 2 Drawing Sheets

POWER SUPPLY CIRCUIT FOR IEEE 1394 INTERFACE

BACKGROUND

1. Technical Field

The disclosure generally relates to power supply circuits, especially to a power supply circuit for an IEEE 1394 interface in a computer.

2. Description of Related Art

The IEEE 1394 interface complies with a serial bus interface standard for high-speed communications and isochronous real-time data transfer as determined by the Institute of Electrical and Electronic Engineers (IEEE), frequently used by personal computers, as well as in digital audio, digital video, automotive, and aeronautics applications. Typically, a +12V DC voltage on a motherboard is used to provide power to the IEEE 1394 interface through a fuse circuit. However, the typical power supply circuit generates lots of noise signals when peripheral devices are hot plugged into the IEEE 1394 interface, which may damage the IEEE 1394 interface control chip.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
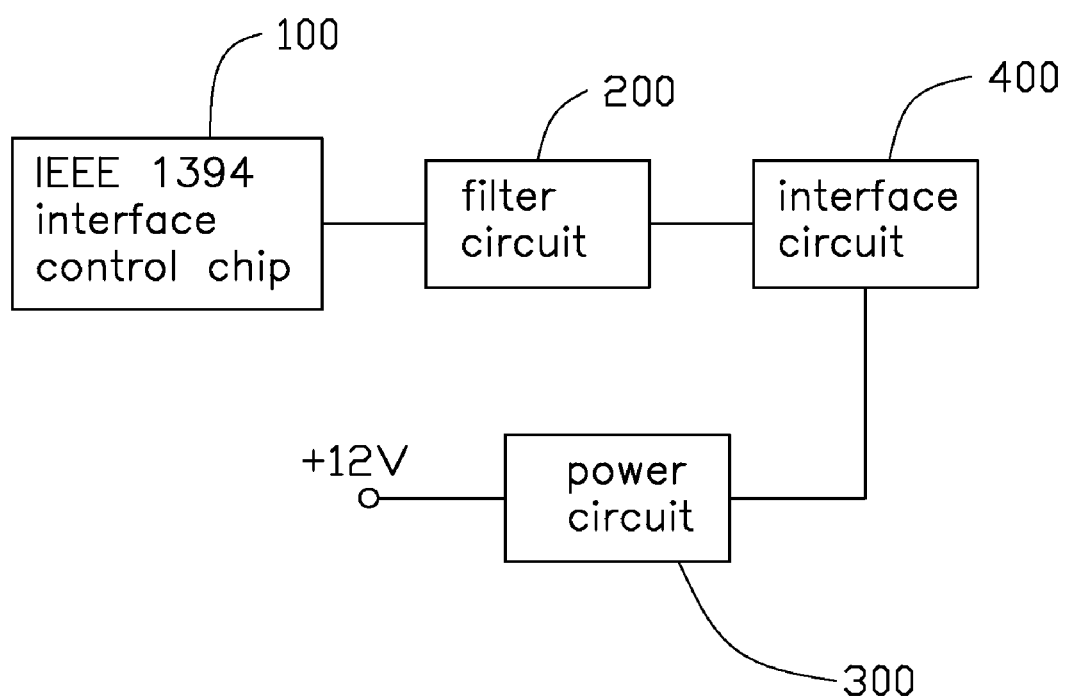
FIG. 1 is a block view of an embodiment of a power supply circuit for an IEEE 1394 interface.

Referring to FIG. 1, a power supply circuit for IEEE 1394 interface includes an IEEE 1394 interface control chip 100, a filter circuit 200, a power circuit 300, and an interface circuit 400. The IEEE 1394 interface control chip 100 is electrically connected to the filter circuit 200 by a number of differential signal transmission lines. The IEEE 1394 interface control chip 100 transmits transmission protocol signals to the filter circuit 200 by the number of differential signal transmission lines. The power circuit 300 provides a +12V working voltage to the interface circuit 400. The interface circuit 400 receives the filtered transmission protocol signals from the filter circuit 200, and exchanges data with a peripheral device (not shown) according to the received transmission protocol signals.

Figure 2:
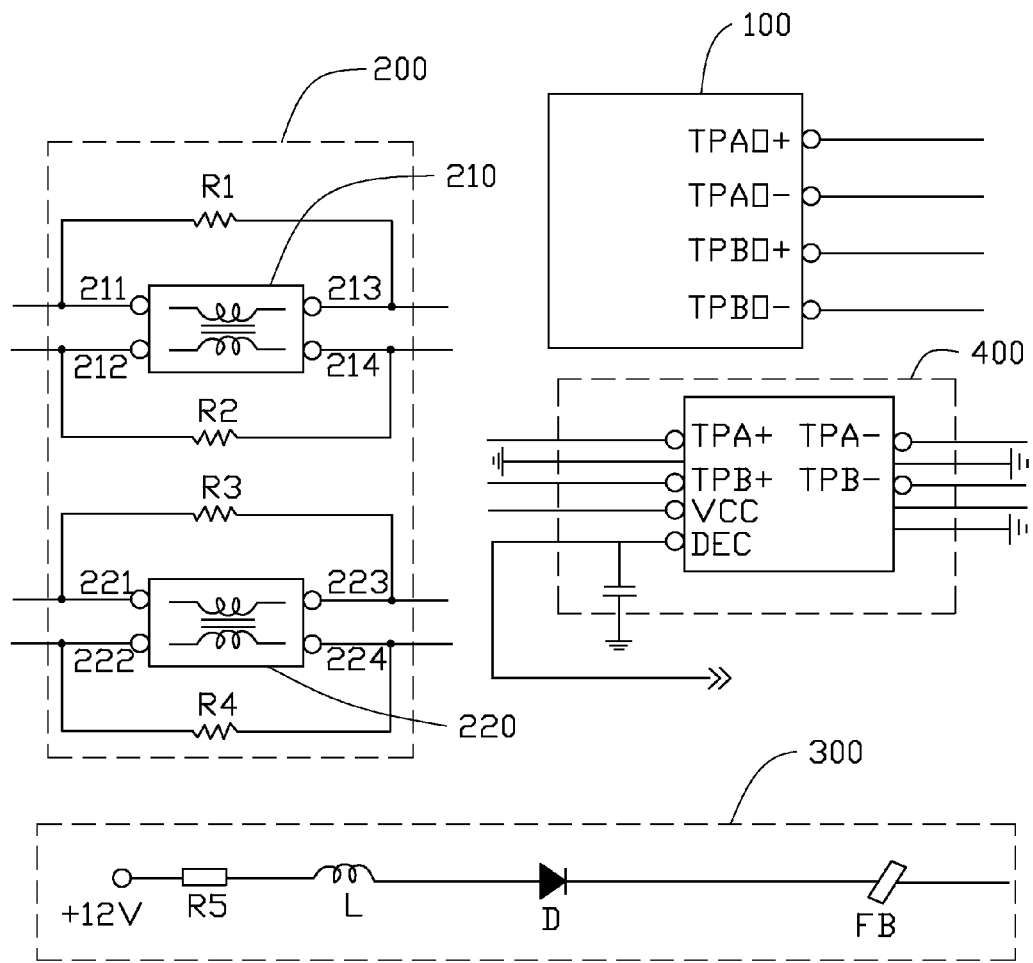
FIG. 2 is circuit view of an embodiment of FIG. 1.

Referring to FIG. 2, the IEEE 1394 interface control chip 100 includes a first differential signal output terminal TPA0+, a second differential signal output terminal TPB0+, a third differential signal output terminal TPA0-, and a fourth differential signal output terminal TPB0-. The filter circuit 200 includes a first common mode choke 210, a second common mode choke 220, and resistors R1~R4. The first common mode choke 210 includes a first choke first differential signal input terminal 211, a first choke second differential signal input terminal 212, a first choke first differential signal output terminal 213, and a first choke second differential signal output terminal 214. The second common mode choke 220 includes a second choke first differential signal input terminal 221, a second choke second differential signal input terminal 222, a second choke first differential signal output terminal 223, and a second choke second differential signal output terminal 224. The first, second, third and fourth differential signal output terminals TPA0+, TPB0+, TPA0- and TPB0- are electrically connected to the first and second choke first differential signal input terminals 211, 221, and the first and second choke second differential signal input terminals 212, 222 respectively by the number of differential signal transmission lines. The resistor R1 is electrically connected to the first choke first differential signal input terminal 211 and the first choke first differential signal output terminal 213. The resistor R2 is electrically connected to the first choke second differential signal input terminal 212 and the first choke second differential signal output terminal 214. The resistor R3 is electrically connected to the second choke first differential signal input terminal 221 and the second choke first differential signal output terminal 223. The resistor R4 is electrically connected to the second choke second differential signal input terminal 222 and the second choke second differential signal output terminal 224.

The power circuit 300 includes a resistor R5, an inductor L, a diode D, and a bead FB. A first terminal of the resistor R5 receives the +12V working voltage. A second terminal of the resistor R5 is electrically connected to an anode of the diode D by the inductor L. The interface circuit 400 includes a first differential signal input terminal TPA+, a second differential signal input terminal TPB+, a third differential signal input terminal TPA-, a fourth differential signal input terminal TPB-, a power terminal VCC, and a detection signal input terminal DEC. The first, second, third, and fourth differential signal input terminals TPA+, TPB+, TPA- and TPB- are electrically connected to the first and second choke first differential signal output terminals 213, 223, and the first and second choke second differential signal output terminals 214, 224 respectively by the number of differential signal transmission lines. The power terminal VCC is electrically connected to a cathode of the diode D by the bead FB. The detection signal input terminal DEC is electrically connected to a south bridge (not shown) for receiving a low voltage level. In one embodiment, a resistance of the resistor R5 is about 10 ohms and an inductance of the inductor L is about 100 nanohenries.

In one embodiment, the IEEE 1394 interface control chip 100 is a TSB43AB22A type control chip produced by TEXAS INSTRUMENTS. The peripheral device is a card reader with IEEE 1394 interface. A CF card is inserted in the card reader. An oscillograph is used to test signal waveforms on the IEEE 1394 interface of the card reader when the CF card exchanges data with the IEEE 1394 interface control chip 100. When the CF card is hot plugged in the card reader, the test shows that a maximum pulse voltage on the first, second, third, and fourth differential signal output terminals TPA0+, TPB0+, TPA0- and TPB0- exceeds +8V when using a common power supply circuit. The resistor R5 and the inductor L form a voltage decreasing circuit when using the power supply circuit of the disclosure. The test shows that a maximum pulse voltage on the first, second, third, and fourth differential signal output terminals TPA0+, TPB0+, TPA0-, and TPB0- is about +3V when using the power supply circuit of the disclosure. Therefore, the IEEE 1394 interface control chip 100 is effectively protected.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply circuit for IEEE 1394 interface, comprising:
   an IEEE 1394 interface control chip capable of outputting transmission protocol signals;
   wherein the IEEE 1394 interface control chip comprises a first differential signal output terminal, a second differential signal output terminal, a third differential signal output terminal, and a fourth differential signal output terminal;
   an interface circuit electrically connected to the IEEE 1394 interface control chip by a number of differential signal transmission lines; wherein the interface circuit is capable of receiving the transmission protocol signals and exchanging data with a peripheral device according to the received transmission protocol signals;
   a power circuit, having a voltage decreasing circuit, capable of providing working voltage to the interface circuit; wherein the voltage decreasing circuit is capable of receiving a DC voltage and converting the received DC voltage to the working voltage; and
   a filter circuit electrically connected to the IEEE 1394 interface control chip and the interface circuit; wherein the filter circuit comprises a first common mode choke and a second common mode choke; each of the first common mode choke and the second common mode choke comprises a first differential signal input terminal, a second differential signal input terminal, a first differential signal output terminal and a second differential signal output terminal; and the first differential signal output terminal, the second differential signal output terminal, the third differential signal output terminal and the fourth differential signal output terminal of the IEEE 1394 interface control chip are respectively electrically connected to the first differential signal input terminals and the second differential signal input terminals of the first common mode choke and the second common mode choke by the number of differential signal transmission lines.

2. The power supply circuit of claim 1, wherein the filter circuit further comprises a first resistor, a second resistor, a third resistor and a fourth resistor; the first resistor is electrically connected to the first differential signal input terminal and the first differential signal output terminal of the first common mode choke; the second resistor is electrically connected to the second differential signal input terminal and the second differential signal output terminal of the first common mode choke; the third resistor is electrically connected to the first differential signal input terminal and the first differential signal output terminal of the second common mode choke; and the fourth resistor is electrically connected to the second differential signal input terminal and the second differential signal output terminal of the second common mode choke.

3. The power supply circuit of claim 2, wherein the interface circuit comprises a first differential signal input terminal, a second differential signal input terminal, a third differential signal input terminal, and a fourth differential signal input terminal; and the first differential signal input terminal, the second differential signal input terminal, the third differential signal input terminal and the fourth differential signal input terminal of the interface circuit are respectively electrically connected to the first differential signal output terminals and the second differential signal output terminals of the first common mode choke and the second common mode choke by the number of differential signal transmission lines.

4. The power supply circuit of claim 1, wherein the interface circuit comprises a power terminal; the power circuit comprises a fifth resistor, an inductor, a diode and a bead; a first terminal of the fifth resistor is capable of receiving the DC voltage; a second terminal of the fifth resistor is electrically connected to an anode of the diode; and a cathode of the diode is electrically connected to the power terminal by the bead.

5. The power supply circuit of claim 4, wherein the interface circuit further comprises a detection signal input terminal which is electrically connected to a south bridge; and the detection signal input terminal is capable of receiving a low voltage level from the south bridge to detect whether the peripheral device is electrically connected to the interface circuit.

6. The power supply circuit of claim 4, wherein a resistance of the fifth resistor is about 10 ohm; and an inductance of the inductor is about 100 nanohenries.

7. A power supply circuit for IEEE 1394 interface, comprising:
   an IEEE 1394 interface control chip capable of outputting transmission protocol signals;
   an interface circuit electrically connected to the IEEE 1394 interface control chip by a number of differential signal transmission lines; wherein the interface circuit is capable of receiving the transmission protocol signals and exchanging data with a peripheral device according to the received transmission protocol signals;
   a filter circuit electrically connected to the IEEE 1394 interface control chip and the interface circuit; wherein the filter circuit comprises a first common mode choke and a second common mode choke; and
   a power circuit, having a voltage decreasing circuit, capable of providing working voltage to the interface circuit; wherein the voltage decreasing circuit is capable of receiving a DC voltage and converting the received DC voltage to the working voltage; wherein the interface circuit comprises a detection signal input terminal which is electrically connected to a south bridge; and the detection signal input terminal is capable of receiving a low voltage level from the south bridge to detect whether the peripheral device is electrically connected to the interface circuit.

8. The power supply circuit of claim 7, wherein the interface circuit further comprises a power terminal; the power circuit comprises a fifth resistor, an inductor, a diode and a bead; a first terminal of the fifth resistor is capable of receiving the DC voltage; a second terminal of the fifth resistor is electrically connected to an anode of the diode; and a cathode of the diode is electrically connected to the power terminal by the bead.

9. The power supply circuit of claim 7, wherein the IEEE 1394 interface control chip comprises a first differential signal output terminal, a second differential signal output terminal, a third differential signal output terminal, and a fourth differential signal output terminal; each common mode choke comprises a first differential signal input terminal, a second differential signal input terminal, a first differential signal output terminal and a second differential signal output terminal; and the first, second, third and fourth differential signal output terminals are electrically connected to their respectively the first differential signal input terminals and the second differential signal input terminals by the number of differential signal transmission lines.

10. The power supply circuit of claim 9, wherein the filter circuit further comprises a first resistor, a second resistor, a third resistor and a fourth resistor; the first resistor is electrically connected to the first differential signal input terminal and the first differential signal output terminal of the first common mode choke; the second resistor is electrically connected to the second differential signal input terminal and the second differential signal output terminal of the first common mode choke; the third resistor is electrically connected to the first differential signal input terminal and the first differential signal output terminal of the second common mode choke; and the fourth resistor is electrically connected to the second differential signal input terminal and the second differential signal output terminal of the second common mode choke.

11. The power supply circuit of claim 10, wherein the interface circuit comprises a first differential signal input terminal, a second differential signal input terminal, a third differential signal input terminal, and a fourth differential signal input terminal; and the first, second, third and fourth differential signal input terminals are respectively electrically connected to the first differential signal output terminals and the second differential signal output terminals by the number of differential signal transmission lines.

12. A power supply circuit for IEEE 1394 interface, comprising:
an IEEE 1394 interface control chip capable of outputting transmission protocol signals;
an interface circuit electrically connected to the IEEE 1394 interface control chip by a number of differential signal transmission lines; wherein the interface circuit comprises a power terminal; the interface circuit is capable of receiving the transmission protocol signals and exchanging data with a peripheral device according to the received transmission protocol signals; and
a power circuit, having a voltage decreasing circuit, capable of providing working voltage to the interface circuit; wherein the power circuit comprises a fifth resistor, an inductor, a diode and a bead; a first terminal of the fifth resistor is capable of receiving the DC voltage; a second terminal of the fifth resistor is electrically connected to an anode of the diode; a cathode of the diode is electrically connected to the power terminal by the bead; and the voltage decreasing circuit is capable of receiving a DC voltage and converting the received DC voltage to the working voltage.

13. The power supply circuit of claim 12, wherein the interface circuit further comprises a detection signal input terminal which is electrically connected to a south bridge; and the detection signal input terminal is capable of receiving a low voltage level from the south bridge to detect whether the peripheral device is electrically connected to the interface circuit.

14. The power supply circuit of claim 12, wherein a resistance of the fifth resistor is about 10 ohm; and an inductance of the inductor is about 100 nanohenries.

15. The power supply circuit of claim 12, further comprising a filter circuit electrically connected to the IEEE 1394 interface control chip and the interface circuit; and the filter circuit comprises a first common mode choke and a second common mode choke.

16. The power supply circuit of claim 15, wherein the IEEE 1394 interface control chip comprises a first differential signal output terminal, a second differential signal output terminal, a third differential signal output terminal, and a fourth differential signal output terminal; each common mode choke comprises a first differential signal input terminal, a second differential signal input terminal, a first differential signal output terminal and a second differential signal output terminal; and the first, second, third and fourth differential signal output terminals are electrically connected to their respectively the first differential signal input terminals and the second differential signal input terminals by the number of differential signal transmission lines.

17. The power supply circuit of claim 16, wherein the filter circuit further comprises a first resistor, a second resistor, a third resistor and a fourth resistor; the first resistor is electrically connected to the first differential signal input terminal and the first differential signal output terminal of the first common mode choke; the second resistor is electrically connected to the second differential signal input terminal and the second differential signal output terminal of the first common mode choke; the third resistor is electrically connected to the first differential signal input terminal and the first differential signal output terminal of the second common mode choke; and the fourth resistor is electrically connected to the second differential signal input terminal and the second differential signal output terminal of the second common mode choke.

18. The power supply circuit of claim 17, wherein the interface circuit comprises a first differential signal input terminal, a second differential signal input terminal, a third differential signal input terminal, and a fourth differential signal input terminal; and the first, second, third and fourth differential signal input terminals are respectively electrically connected to the first differential signal output terminals and the second differential signal output terminals by the number of differential signal transmission lines.

* * * * *